(12) United States Patent
Tomlin et al.

(10) Patent No.: US 12,494,659 B1
(45) Date of Patent: Dec. 9, 2025

(54) GENERATING VEHICLE WAKEUP SIGNAL

(71) Applicant: Motiv Power Systems, Inc., Foster City, CA (US)

(72) Inventors: Justin Tomlin, San Francisco, CA (US); Venkatesh Prasad Hanglur Narasimha, Foster City, CA (US); James Michael Castelaz, Alameda, CA (US)

(73) Assignee: Motiv Power Systems, Inc., Foster City, CA (US)

( * ) Notice: Subject to any disclaimer, the term of this patent is extended or adjusted under 35 U.S.C. 154(b) by 833 days.

(21) Appl. No.: 17/710,768

(22) Filed: Mar. 31, 2022

Related U.S. Application Data (60) Provisional application No. 63/169,188, filed on Mar. 31, 2021.

(51) Int. Cl.
| | |
|---|---|
| *H02J 7/00* | (2006.01) |
| *B60L 53/14* | (2019.01) |
| *B60L 53/66* | (2019.01) |

(52) U.S. Cl.
CPC ........... *H02J 7/00711* (2020.01); *B60L 53/14* (2019.02); *B60L 53/66* (2019.02); *H02J 7/007182* (2020.01)

(58) Field of Classification Search
CPC . H02J 7/00711; H02J 7/007182; B60L 53/14; B60L 53/66
USPC ........................................................ 320/109
See application file for complete search history.

(56) References Cited

U.S. PATENT DOCUMENTS

| | | | | |
|---|---|---|---|---|
| 4,052,647 | A * | 10/1977 | Thompson | B60L 15/04 318/139 |
| 2012/0074903 | A1* | 3/2012 | Nakashima | G07F 15/005 320/109 |
| 2013/0099742 | A1* | 4/2013 | Takashima | B60L 3/04 320/109 |
| 2013/0119931 | A1* | 5/2013 | Klesyk | G06F 1/263 320/109 |
| 2013/0162208 | A1* | 6/2013 | Ohnuki | B60L 53/65 320/109 |
| 2015/0212135 | A1* | 7/2015 | Jin | G01R 31/006 324/538 |

(Continued)

*Primary Examiner* — Julian D Huffman
*Assistant Examiner* — John P Ondrasik
(74) *Attorney, Agent, or Firm* — Adibi IP Group, PC; Amir V. Adibi; Andrew C. Palmer (57) ABSTRACT

A vehicle includes a wakeup circuit and a connector. When the connector is connected to a charging station, the wakeup circuit receives a charging control signal from the charging station. The wakeup circuit generates a wakeup pulse using a filtered version of the charging control signal (CPFS) and a reset signal. The reset signal transitions state when the filtered version of the charging control signal crosses a threshold. In one embodiment, the wakeup circuit comprises a reset circuit, a wakeup pulse generator, and an optocoupler. The reset circuit generates the reset signal that inhibits the wakeup circuit so that only one wakeup pulse is generated until removal of the CPFS. In another embodiment, the wakeup circuit includes a filter that generates the CPFS, a wakeup comparator circuit that generates the reset signal based on the CPFS, and a reset circuit that generates the wakeup pulse based on the reset signal.

14 Claims, 10 Drawing Sheets

(56) References Cited

U.S. PATENT DOCUMENTS

2015/0352967 A1* 12/2015 Timpf, Jr. ............... B60L 53/14
320/109

* cited by examiner

GENERATING VEHICLE WAKEUP SIGNAL

CROSS-REFERENCE TO RELATED APPLICATIONS

This application claims the benefit under 35 U.S.C. § 119 from U.S. Provisional Patent Application Ser. No. 63/169,188, entitled "Generating Vehicle Wakeup Signal," filed on Mar. 31, 2021, the subject matter of which is incorporated herein by reference.

TECHNICAL FIELD

The described embodiments relate to vehicle wakeup and charging devices.

BACKGROUND INFORMATION

Electric vehicles are gaining widespread acceptance in both public and private sectors. These vehicles include both electric and hybrid vehicles. Both vehicle types require a charging solution and often come with an on-board charger. The on-board charger is used to charge batteries and power accessory devices of the vehicle.

SUMMARY

In various exemplary embodiments, methods and apparatus are provided for generating a wakeup signal for use in an electric vehicle. In an exemplary embodiment, when an electric vehicle in sleep mode is plugged into a charging system, a charging signal generator generates the appropriate charging signals from power signals received from the charging system. One of the charging signals is used to trigger a wakeup circuit that generates a wakeup signal to wake up various systems of the electric vehicle. The wakeup circuit also generates an inhibit signal to prevent the generation of multiple wakeup signals during a single plug-in event.

In one embodiment, an apparatus is provided that includes an amplifier, a pulse generator, and a reset circuit. The amplifier receives a charging control signal and generates a clipped and buffered version of the charging control signal. A clipped signal is one that maintains the voltage level of an input within a defined voltage range, but then fixes to the limit of the voltage range when the input moves beyond that limit and outside of the defined voltage range. In one embodiment, the charging control signal is clipped using a diode so that an output of the diode is maintained at 0.7V when an input of the diode drops below 0.7V. The pulse generator generates a wakeup pulse signal from the clipped and buffered version of the charging control signal. The reset circuit allows the pulse generator to generate only one wakeup pulse signal until the reset circuit is reset.

In another embodiment, a method is provided that includes receiving a charging control signal. Next, a clipped and buffered version of the charging control signal is generated. Next, a wakeup signal is generated from the clipped and buffered version of the charging control signal. Only one wakeup signal is generated until the reset circuit is reset.

In another embodiment, an apparatus is provided that includes a pulse generator and a reset circuit. In operation, the pulse generator generates a wakeup pulse signal using a filtered version of the charging control signal and a reset signal. The reset signal transitions state when the filtered version of the charging control signal crosses a threshold.

The foregoing is a summary and thus contains, by necessity, simplifications, generalizations and omissions of detail; consequently it is appreciated that the summary is illustrative only. Still other methods, and structures and details are set forth in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

In various embodiments, a charging apparatus having a wakeup circuit is provided for use in a vehicle. Reference will now be made in detail to some embodiments of the wakeup circuit, examples of which are illustrated in the accompanying drawings.

Figure 1:
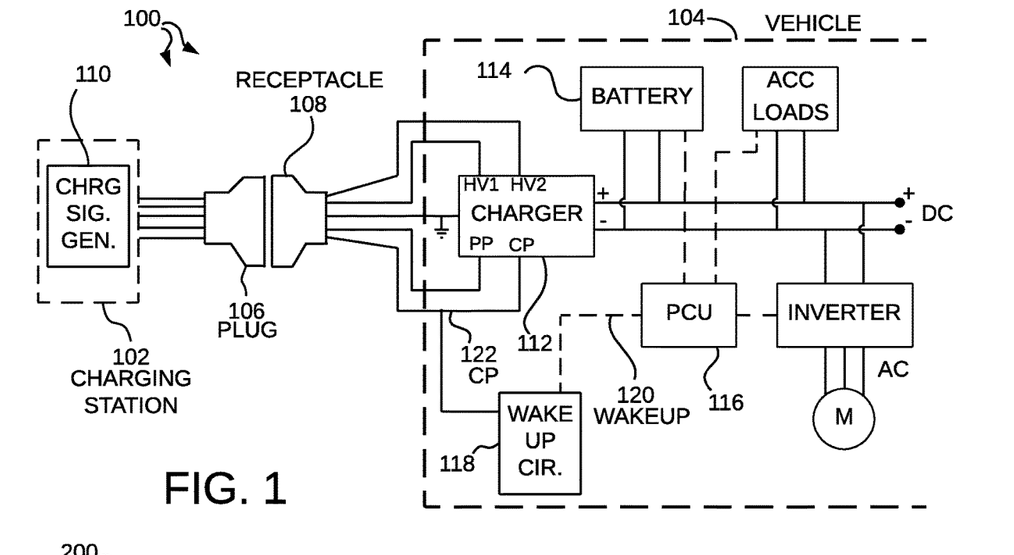
FIG. 1 is a diagram of a vehicle charging configuration that includes one embodiment of a wakeup circuit that generates a vehicle wakeup signal.

FIG. 1 is a diagram of a vehicle charging configuration 100 that includes one embodiment of a wakeup circuit 118 that generates a vehicle wakeup signal 120. As illustrated in FIG. 1, an electric vehicle charging station 102 provides power to charge a battery 114 of the vehicle 104. Power from the charging station 102 is provided through a cable that has an attached plug 106. A matching receptacle 108 is provided at the vehicle 104. When the plug and receptacle are connected, signals flow between the charging station 102 and a charger 112. For example, these signals include two high voltage signals (HV1, HV2), an earth ground, a control pilot (CP) signal 122, and a proximity pilot (Prox) signal. The charging signal generator 110 generates charging signals that are used to operate the charger 112 of the vehicle 104 including the control pilot (CP) signal 122. The Prox signal indicates when the charging station 102 is attached to the vehicle 104 (e.g., by plug 106 and receptacle 108). The CP signal 122 indicates different states of readiness and capability of the charging station 102 and vehicle 104 with respect to providing charging power through the HV1 and HV2 signals.

A wakeup circuit 118 is provided that receives power and the CP signal 122 from the charging signal generator 110. The wakeup circuit 118 generates a wakeup signal 120 from the CP signal 122. For example, when the vehicle 104 is in a "sleep" mode, the wakeup circuit 118 generates the wakeup signal 120 when the charging station 102 is connected to the vehicle 104 to provide charging power. The wakeup signal 120 operates to wake up (or activate) vehicle systems, such as the programmable control unit (PCU) 116, during the charging process. A more detailed description of implementation and operation of the wakeup circuit 118 is provided below.

Figure 2:
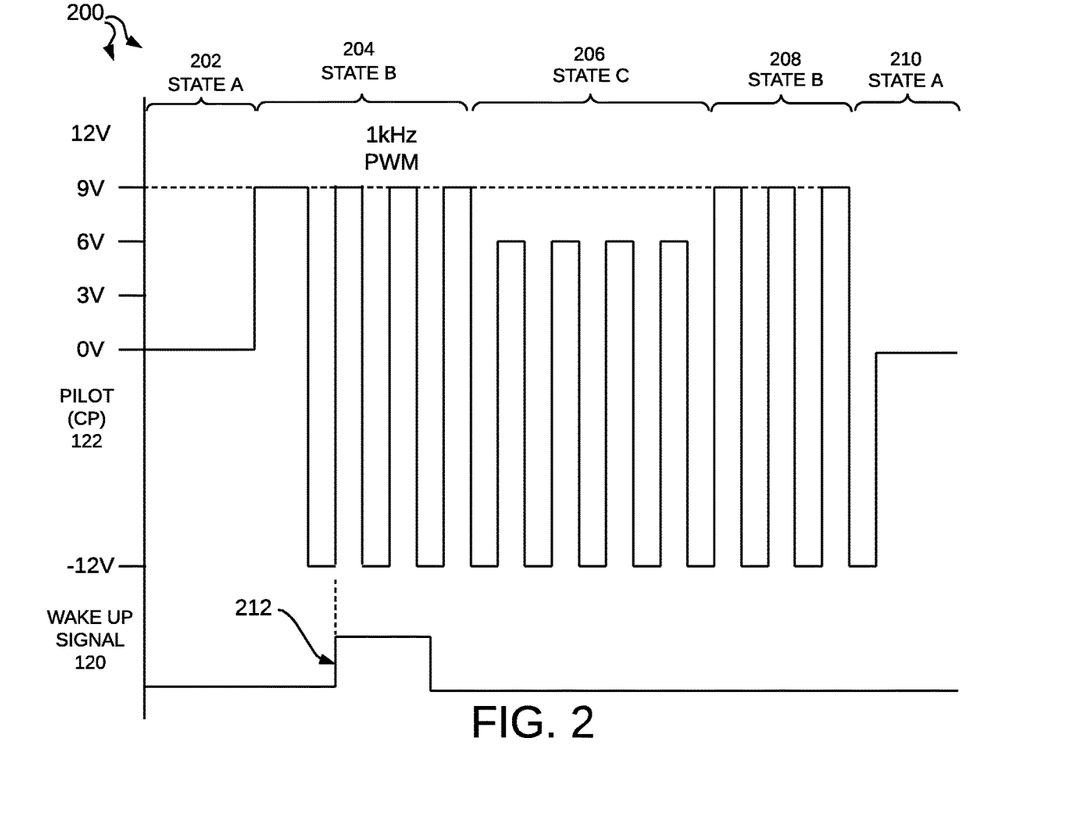
FIG. 2 is a graph that illustrates the operation and timing of a PILOT (CP) signal that is used for wakeup signal generation.

FIG. 2 is a graph 200 that illustrates the operation and timing of a Pilot (CP) signal 122 that is used for wakeup signal generation. During time interval 202 (indicated as STATE A), the charging station 102 is disconnected from vehicle 104 and the vehicle is in a sleep mode. For example, the connectors 106 and 108 are unconnected. During this interval, the Pilot signal 122 is maintained at 12 volts at the charging station 102, but on the vehicle side, the Pilot signal 122 is at zero volts.

At the start of time interval 204 (indicated as STATE B), the plug 106 and receptacle 108 are connected. At this time, the charger 112 adjusts the Pilot signal 122 to 9 volts, which is provided to the vehicle.

The charging station 102 responds by placing a 1 kHz pulse width modulated (PWM) signal on the Pilot signal. This PWM Pilot signal during STATE B indicates to the charger 112 that the charging station 102 is ready to provide charging power on the high voltage (HV1, HV2) lines.

In one embodiment, the wakeup signal 120 is at a low level until the first rising edge of the CP signal as indicated at 212. The wakeup signal goes to a high level that indicates a wakeup condition to various systems of the vehicle 104. The wakeup signal 120 returns to a low level after a selectable time interval.

If battery charging is needed, the Pilot signal 122 enters a charging mode during the time interval 206 (indicated by STATE C). During the charging mode, power is provided by the charging station on the HV1 and HV2 lines. When charging is complete, the Pilot signal 122 returns to STATE B during time interval 208. If the plug 106 and receptacle 108 are then disconnected, the Pilot signal 122 returns to STATE A as indicated at 210.

Figure 3:
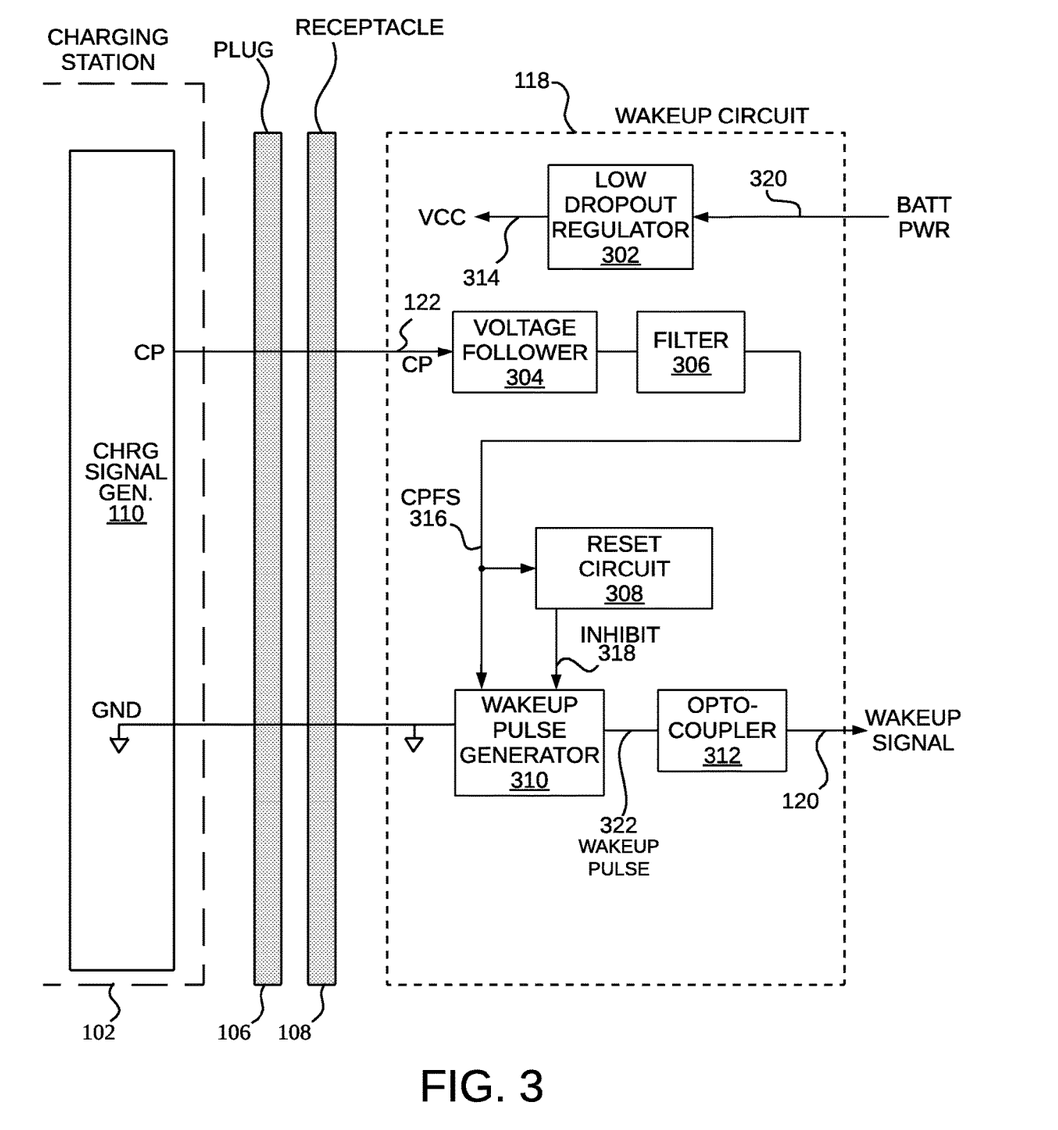
FIG. 3 is a diagram of a detailed embodiment of the wakeup circuit shown in FIG. 1.

FIG. 3 is a diagram of a detailed embodiment of the wakeup circuit 118 shown in FIG. 1. In this embodiment, the wakeup circuit 118 comprises a low dropout voltage regulator 302, voltage follower 304, filter 306, reset circuit 308, wakeup pulse generator 310, and opto-coupler 312.

During operation, the low dropout regulator 302 receives battery power (BATT PWR) 320 from the vehicle battery and generates a supply voltage (VCC) 314 that is used to power other circuitry of the wakeup circuit 118.

The CP signal 122 received from the charging station 102 is input to the voltage follower 304, which provides clipping and buffering to the CP signal 122. The filter 306 provides low-pass filtering of the CP signal 122 after clipping and buffering and the filtered result is a CP filtered signal (CPFS) signal 316 that is input to the reset circuit 308 and the wakeup pulse generator 310.

The wakeup pulse generator 310 receives the CPFS signal 316 and generates a wakeup pulse 322 on a rising edge of the CPFS signal 316. As illustrated in FIG. 2, when the CP signal 122 is provided with a 1 kHz PWM signal, the wakeup pulse generator 310 generates the wakeup pulse 322 on a rising edge of the PWM signal. The generated wakeup pulse 322 is input to the opto-coupler 312. The opto-coupler 312 provides isolation and outputs the generated wakeup pulse 322 as the wakeup signal 120.

The reset circuit 308 also receives the CPFS signal 316 and generates an inhibit signal 318 that is input to the wakeup pulse generator 310. The inhibit signal 318 inhibits the wakeup pulse generator 310 from generating more than one wakeup pulse. Thus, during the charging operation, even though the CP signal 122 is provided as a PWM signal with many rising edges, only one wakeup pulse will be generated.

If the plug 106 and the receptacle 108 are disconnected, the CP signal 122 will be removed from the wakeup circuit 118. This will reset the reset circuit 308 and thereby allow the wakeup pulse generator 310 to generate another wakeup pulse when the CP signal 122 is reapplied to the circuit.

Figure 4:
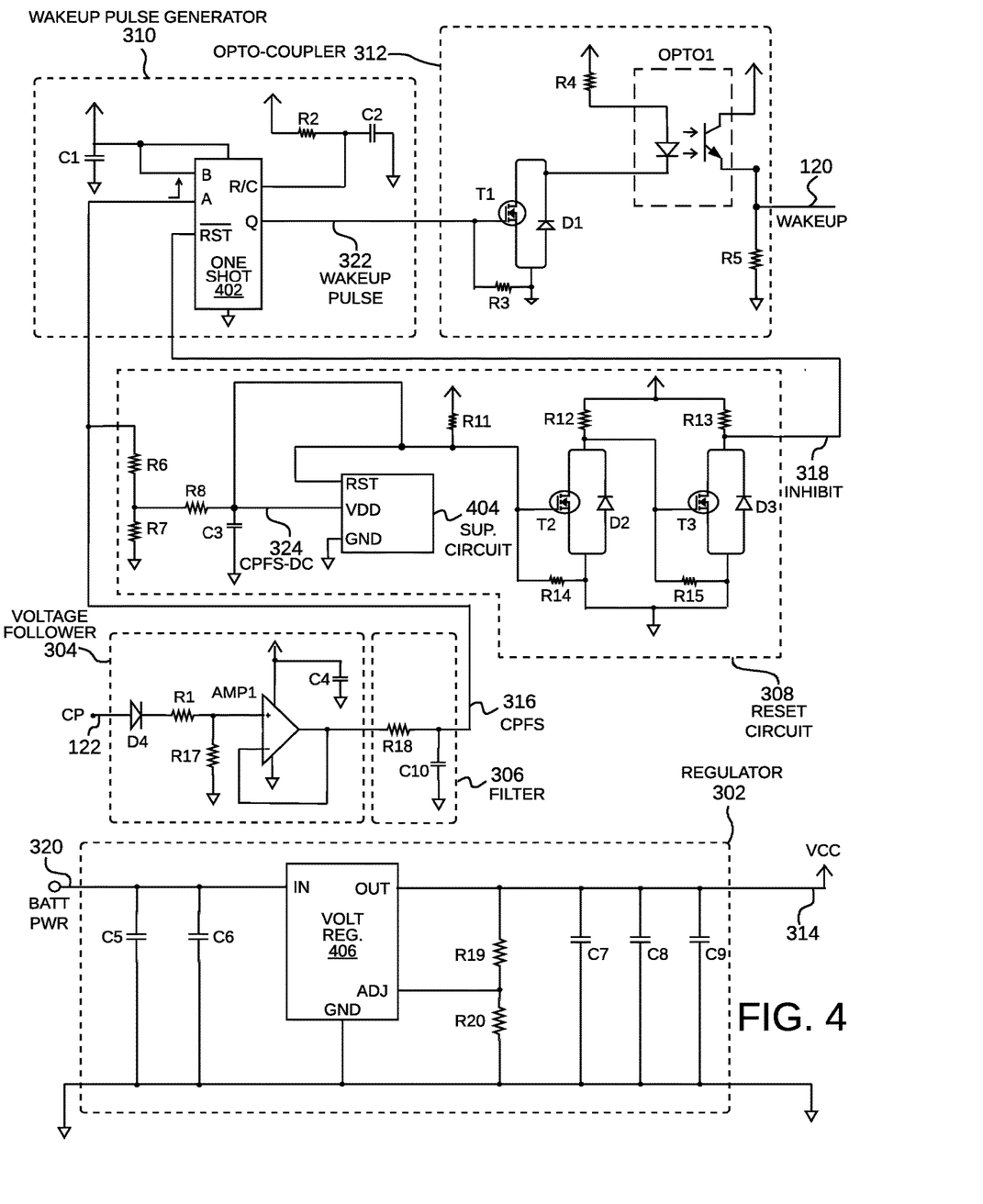
FIG. 4 is a diagram of a detailed embodiment of the wakeup circuit shown in FIG. 3.

FIG. 4 is a diagram of a detailed embodiment of the wakeup circuit 118 shown in FIG. 3. In this embodiment, the wakeup circuit 118 comprises voltage regulator 302, voltage follower 304, filter 306, reset circuit 308, wakeup pulse generator 310, and opto-coupler 312.

In an embodiment, the regulator 302 comprises a low dropout voltage regulator 406, capacitors C5-C9, and resistors R19-R20. In an embodiment, the low dropout voltage regulator 406 is a NCV2931ACDR2G semiconductor device. The regulator 302 receives the battery power signal 320 at its input and generates a regulated VCC signal 314 at its output.

In an embodiment, the components of the voltage regulator 302 have the following component values, where the capacitance values are in microfarads (uF) and the resistance values are in ohms (e.g., 1000 ohms=1 k). The capacitor values are C5=10 uF, C6=0.1 uF, C7=10 uF, C8=10 uF, and C9=0.1 uF. The resistor values are R19=20 k and R20=182 k.

In an embodiment, the voltage follower 304 comprises amplifier (AMP1), resistors R1 and R17, diode D4, and capacitor C4. In an embodiment, the AMP1 device is a OPA9901DBVR semiconductor device. The voltage follower 304 receives the CP signal 122 at its input and provides a clipped and buffered signal at its output, which is input to the filter 306. The diode D4 prevents the input from experiencing large negative voltages.

In an embodiment, the components of the voltage follower 304 have the following component values. The capacitor values are C4=1 uF and the resistor values are R1=10 k and R17=10 k.

In an embodiment, the filter 306 comprises resistor R18 and capacitor C10. The filter 306 is configured to low-pass filter the output of the voltage follower 304 to generate the CP filtered (CPFS) signal 316.

In an embodiment, the components of the filter 306 have the following component values. The capacitor value is C10=47 nF (nanoFarads) and the resistor value is R18=470 ohms. In another embodiment, the filter 306 is optional and the output of the voltage follower 304 is input directly to the wakeup pulse generator 310 and the reset circuit 308.

In an embodiment, the wakeup pulse generator 310 comprises one shot device 402, resistor R2, and capacitors C1 and C2. In an embodiment, the one shot device is a NLV14538B semiconductor device. The wakeup pulse generator 310 is configured to generate a wakeup pulse 322 in response to a rising edge of the CPFS signal 316. The duration of the wakeup pulse 322 is determined by the values of R2 and C2.

In an embodiment, the components of the wakeup pulse generator 310 have the following component values. The capacitor values are C1=1 uF and C2=10 uF and the resistor value is R2=10 k.

In an embodiment, the opto-coupler 312 comprises a transistor device (T1), a diode (D1), resistors R3, R4, and R5, and an optical isolator (OPTO1). In an embodiment, the transistor device (T1) is a depletion mode MOSFET semiconductor device and the OPTO1 device is a TLP785F semiconductor device. The opto-coupler 312 is configured to receive the wakeup pulse 322 and provide isolation to output the wakeup signal 120.

In an embodiment, the components of the opto-coupler 312 have the following component values. The resistor values are R3=10 k ohms, R4=499 ohms, and R5=20 k ohms.

In an embodiment, the reset circuit 308 comprises supervisor circuit 404, transistors T2 and T3, diodes D2 and D3, capacitor C3, and resistors R6-R8 and R11-R15. In an embodiment, the supervisor circuit 404 is a TPS3840DL semiconductor device, the transistors T2 and T3 are depletion mode MOSFET semiconductor devices and provide level-shifting. The reset circuit 308 is configured to generate the inhibit signal 318 in response to the CPFS signal 316. In an embodiment, a small delay is inserted between the rising edge of the CPFS signal 316 and the falling edge of the inhibit signal 318. For example, resistor R8 and capacitor C3 form a low-pass filter which causes a delay between the rising edge of the CPFS signal 316 and the input to the supervisor circuit 404. This low-pass filter also filters the supervisor circuit 404 input so that the input stays above the reset threshold of the supervisor circuit 404 so long as the CLPS signal 316 continues to oscillate. The supervisor circuit 404 will continue to output an inhibit signal 318 until the CPFS signal 316 ceases to oscillate, preventing further wakeup pulses until the CPFS signal 316 returns to a constant, non-oscillating value below the reset threshold or is removed. Once the inhibit signal 318 reaches a low logic level, the one shot 402 is prevented from generating pulses in response to additional rising edges of the CPFS signal 316. When the CPFS signal 316 is removed and reads zero volts, the reset circuit 308 will set the inhibit signal 318 to a logic high level so that the wake-up pulse generator 310 may generate a new wakeup pulse 322 upon re-application of the CPFS signal 316.

In an embodiment, the components of the reset circuit 308 have the following component values. The capacitor C3=1 uF, and the resistors R6=24 k ohms, R7=10 k ohms, R8=10 k ohms, R11=1 k ohms, R12=1 k ohms, R13=1 k ohms, R14=10 k ohms, and R15=10 k ohms.

Figure 5:
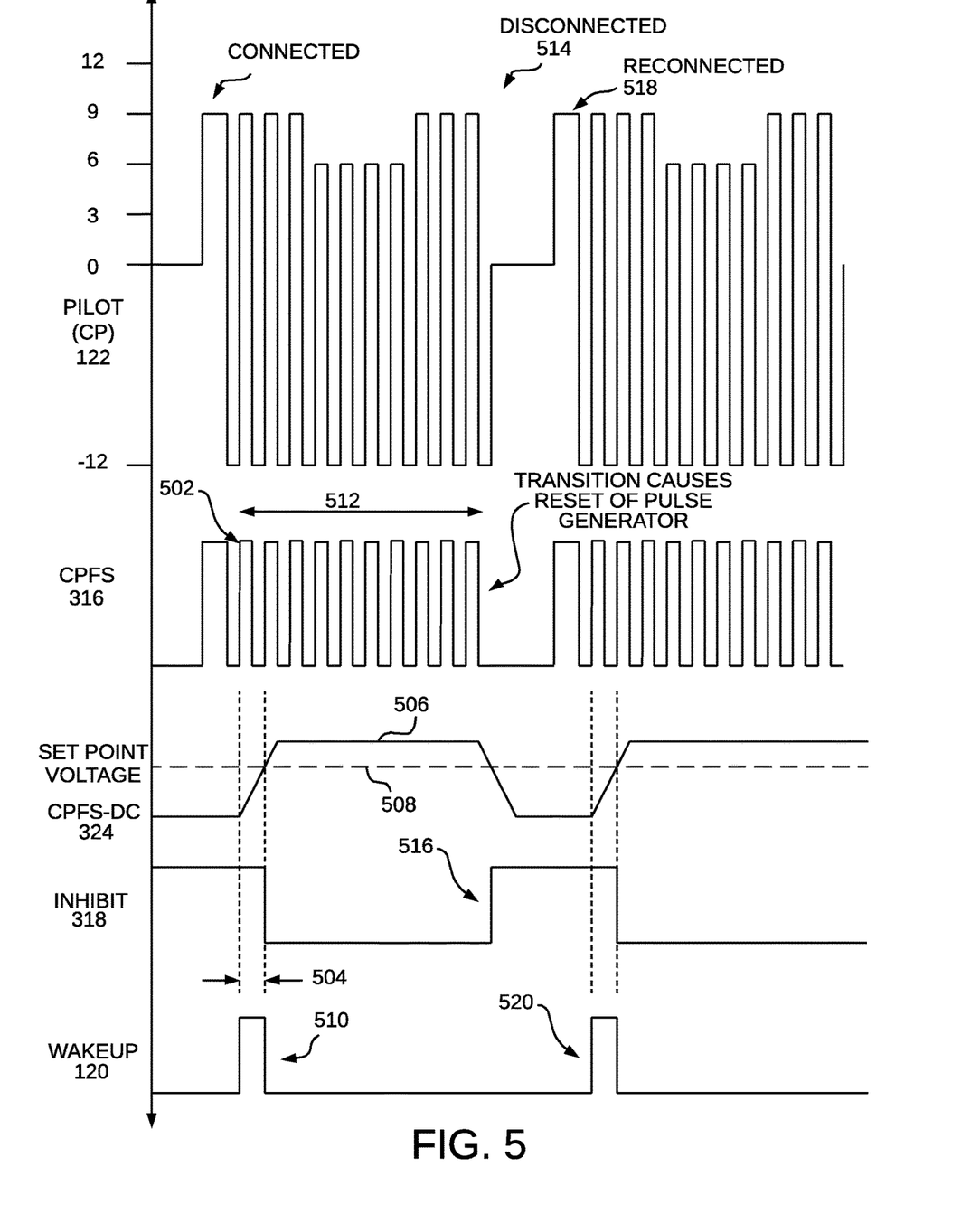
FIG. 5 is a timing diagram that illustrates the generation of a wakeup signal by the wakeup circuit shown in FIG. 4.

FIG. 5 is a diagram of a timing diagram that illustrates the generation of the wakeup signal 120 by the wakeup circuit 118 shown in FIG. 4. FIG. 5 illustrates the Pilot (CP) signal 122 as it is input to the voltage follower 304 after connection of the vehicle 104 to the vehicle charging station 102. The output of the voltage follower 304 is input to the filter 306, and the output of the filter 306 is the CPFS signal 316 shown in FIG. 5.

A rising edge 502 of the CPFS signal 316 triggers the wakeup signal 120 to be generated, as indicated at 510. For example, the rising edge 502 of the CPFS signal 316 triggers the wakeup pulse generator 310 to generate the wakeup pulse 322, which is isolated to form the wakeup signal 120. The wakeup signal 120 has a duration 504 that is determined by the time between the rising edge of the CPFS signal 316 and the falling edge of the inhibit signal 318. When the inhibit signal 318 is at a low level, the output of the one shot 402 is reset to a low level.

The CPFS signal 316 is used by the reset circuit 308 to generate the inhibit signal 318. For example, the CPFS signal 316 is converted to a DC level signal (CPFS-DC 324) by the capacitor C3 at the input to the supervisor circuit 404, as indicated at 506. The supervisor circuit 404 has an internal set point voltage (indicated at 508) and generates the inhibit signal 318 to have a falling edge in response to the rising level of the CPFS-DC signal 324 (indicated at 508) exceeding the set point voltage. The inhibit signal 318 remains at a low level while the vehicle remains connected to the charging station. The inhibit signal 318 inhibits the one shot 402 from generating any additional wakeup pulses while the vehicle is still connected to the charging station. For example, the region 512 shows that additional rising edges of the CPFS signal 316 do not generate additional wakeup pulses.

After the vehicle is charged, the vehicle is disconnected from the charging station as indicated at 514. Disconnecting the vehicle from the charging station results in the inhibit signal 318 being reset to a high level, as indicated at 516.

At some point the vehicle is reconnected to the charging station, as indicated at 518. Since the inhibit signal 318 was reset to a high level, another wakeup signal 120 can be generated at the rising edge of the CPFS signal 316, as shown at 520.

Figure 6:
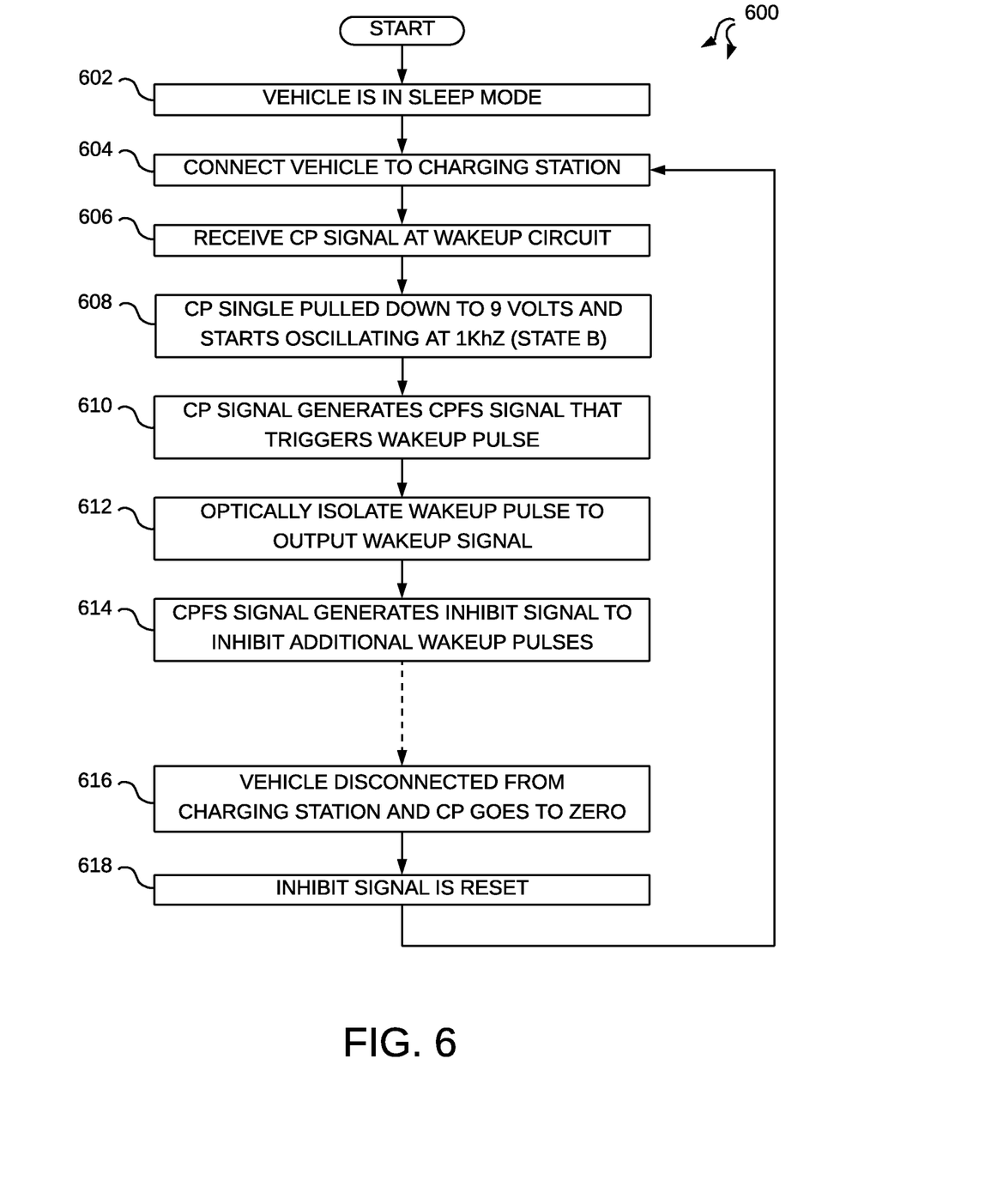
FIG. 6 is a flowchart of a method for generating a wakeup signal during a vehicle charging operation in accordance with one novel aspect.

FIG. 6 is a flowchart of a method 600 for generating a wakeup signal when a vehicle is connected to a charging station in accordance with one novel aspect. For example, the method 600 is suitable for use with the wakeup circuit 118 shown in FIGS. 2, 3, and 4.

At block 602, a vehicle is in sleep mode. For example, the vehicle 104 is in a sleep mode in which systems are placed in a low-power mode to conserve battery life.

At block 604, the vehicle is connected to a charging station. For example, the vehicle 104 is connected to the charging station 102 using plug 106 and receptacle 108. This configuration allows charging signals to flow to the charging signal generator 110.

At block 606, a CP signal is received at the wakeup circuit. For example, the CP signal 122 is received at the wakeup circuit 118.

At block 608, the CP signal is pulled down to 9 volts and starts oscillating at 1 KHz. For example, as illustrated in FIG. 2, the CP signal 122 enters (STATE B) 204.

At block 610, the CP signal is used to generate the CPFS signal, which triggers the generation of a wakeup pulse. For example, the CP signal 122 is clipped, buffered, and filtered to generate the CPFS signal 316 that is input to the wakeup pulse generator 310. The wakeup pulse generator 310 generates a wakeup pulse 322 in response to a rising edge of the CPFS signal 316. The rising edge occurs when the CP signal 122 transitions from a constant-voltage state into an oscillating voltage state.

At block 612, the wakeup pulse is optically isolated to generate an open-collector wakeup signal. For example, the opto-coupler (312) isolates the wakeup pulse signal 322 to output the wakeup signal 120.

At block 614, the CPFS signal generates an inhibit signal to inhibit additional wakeup pulses. For example, the CPFS signal 316 is filtered to generate the CPFS-DC signal 324. The supervisor circuit 404 includes an internal voltage setpoint. When the level of the CPFS-DC signal 324 exceeds the voltage setpoint, the inhibit signal 318 is generated to have a low logic level. The inhibit signal 318 remains at a low level for the duration of the time that the vehicle is connected to that charging station and inhibits the wakeup pulse generator 310 from generating any additional wakeup pulses. Thus, only one wakeup pulse is generated after the vehicle is connected to the charging station.

At block 616, the vehicle is disconnected from the charging station. As a result, the CP signal 122 goes to zero, as does the CPFS signal 316.

At block 618, the inhibit signal is reset. For example, when the CPFS signal 316 goes to zero, the CPFS-DC signal 324 falls below the voltage setpoint of the supervisor circuit 404. This causes the inhibit signal 318 to go to a high level that does not inhibit the one shot 402 from generating pulses. The method then proceeds to block 604 when the vehicle is reconnected to the charging station.

It should be noted that method 600 is exemplary and that changes, modifications, deletions, combinations, or additions to the method operations are within the scope of the exemplary embodiments.

Figure 7:
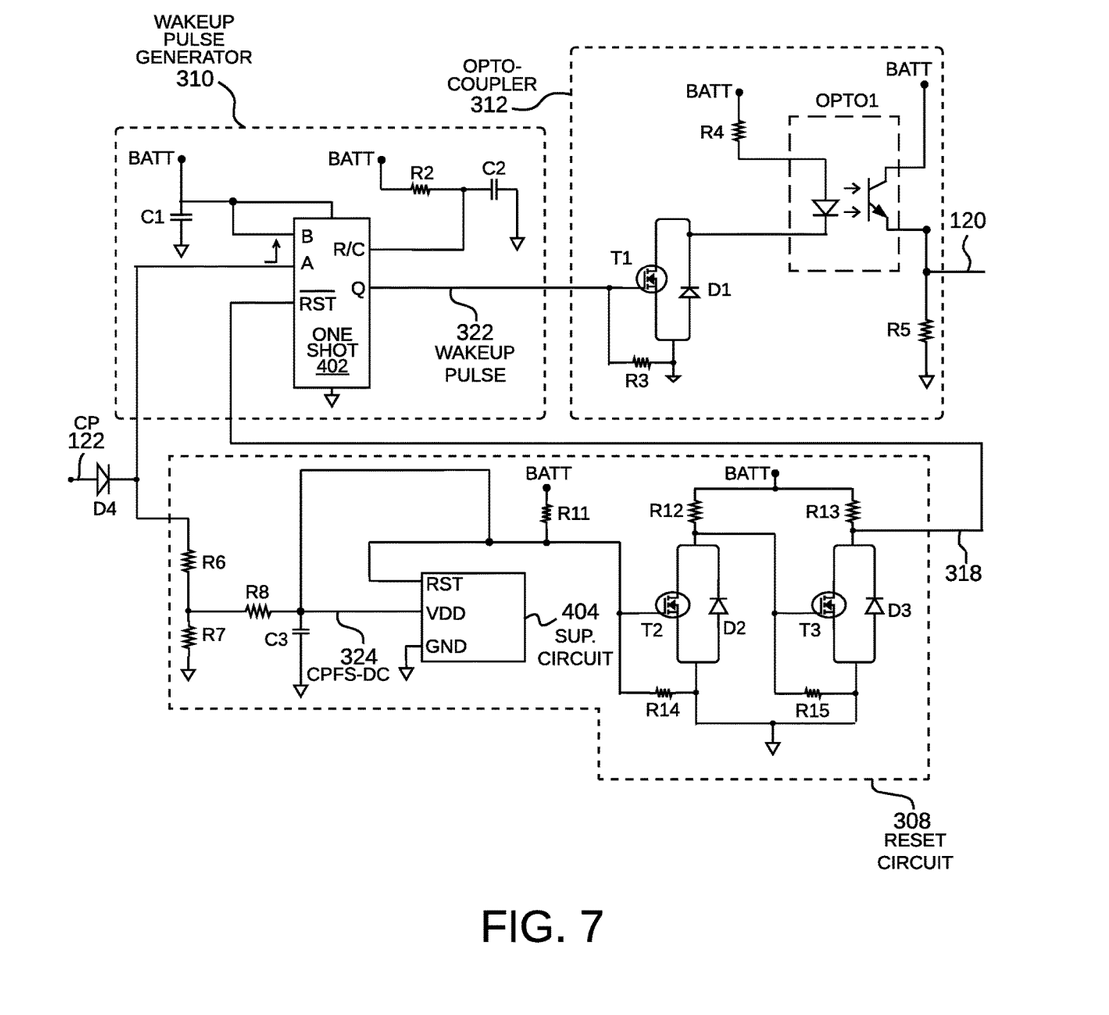
FIG. 7 is a diagram of another embodiment of the wakeup circuit shown in FIG. 3.

FIG. 7 is a diagram of another embodiment of the wakeup circuit 118 shown in FIG. 3. For example, the wakeup circuit of FIG. 7 does not include the voltage follower circuit 304, which clips and buffers the CP signal 122. The circuit of FIG. 7 also does not include the filter 306. Thus, the CP signal 122 flows through the diode D4 and directly into the wakeup pulse generator 310 and the reset circuit 308. The regulator 302 also is omitted from the circuit of FIG. 7. Thus, the circuitry is directly connected to receive battery power.

Figure 8:
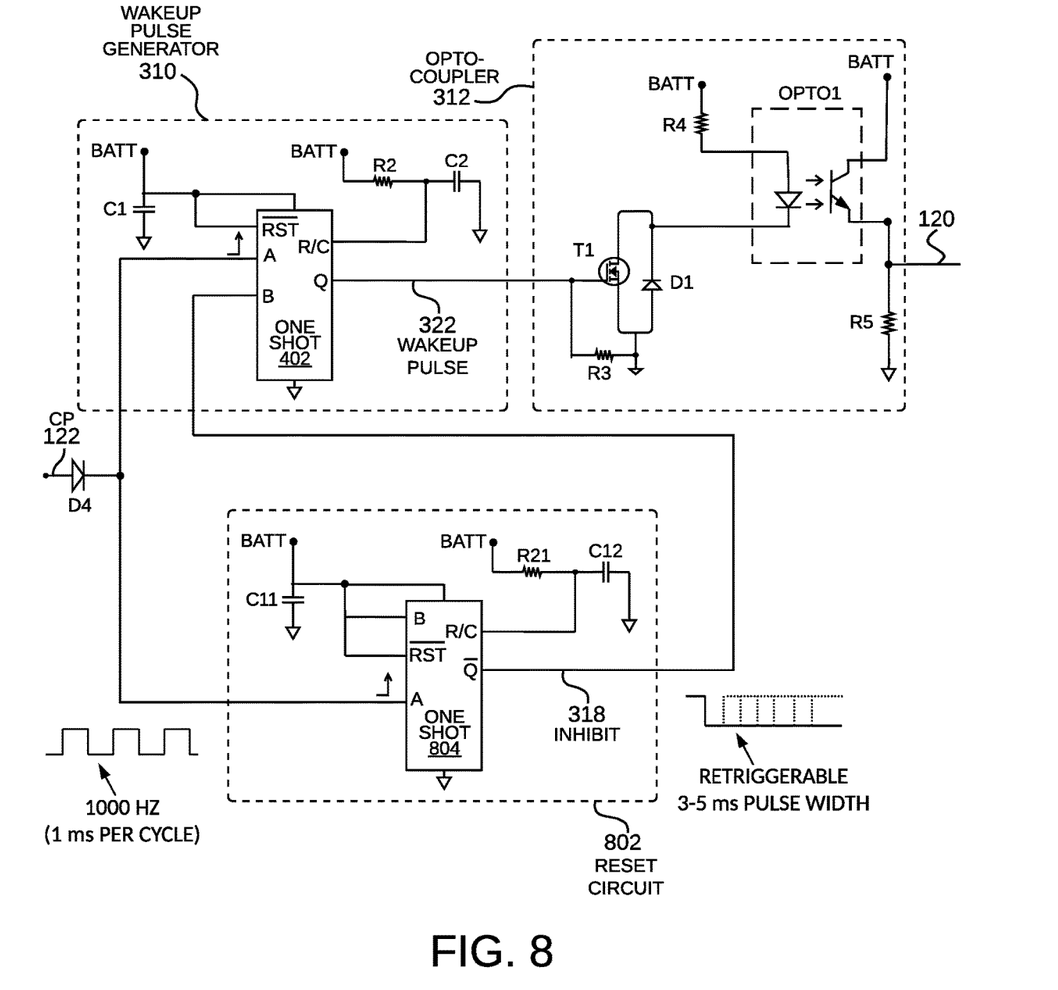
FIG. 8 is a diagram of yet another embodiment of the wakeup circuit shown in FIG. 3.

FIG. 8 is a diagram of yet another embodiment of the wakeup circuit 118 shown in FIG. 3. In this embodiment, the wakeup circuit shown in FIG. 8 is similar to the wakeup circuit shown in FIG. 7, except that the reset circuit 308 is replaced with the reset circuit 802.

In an embodiment, the reset circuit 802 comprises one shot device 804, capacitors C11 and C12, and resistor R21. In an embodiment, the one shot device 804 is the same type as the one shot device 402 and may be provided within the same semiconductor package. During operation, the reset circuit 802 receives the CP signal 122 after it flows through the diode D4. As illustrated in FIG. 2, the CP signal 122 comprises a 1 kHz PWM signal during states B and C. A rising edge of the CP signal 122 triggers both the one shot device 402 and the one shot device 804. In response to the rising edge of the CP signal 122, the one shot device 402 generates the wakeup pulse 322 as described above.

In response to the rising edge of the CP signal 122, the one shot device 802 generates the inhibit signal 318 to have a low logic level. The low level of the inhibit signal 318 prevents the one shot device 402 from generating any additional wakeup pulses.

The one shot device 804 is a retriggerable device that is set to have an output pulse width greater than 1 millisecond (ms). Since the CP signal 122 provides a rising edge every 1 ms, the one shot device 804 will continuously retrigger in response to the CP signal 122, thereby maintaining the inhibit signal 318 at a low logic level, which disables the one shot device 402 from generating additional wakeup pulses 322. Once the CP signal 122 stops oscillating, the one shot device 804 will stop retriggering and the inhibit signal 318 will return to a logic high level that re-enables the one shot device 402 to generate another wakeup pulse when the CP signal 122 begins to oscillate again.

In an embodiment, the components of the reset circuit 802 have the following component values. The capacitor C11 has a value of C11=1 uF. The resistor R21 and the capacitor C12 are chosen so that the output pulse width of the one shot device 804 is greater than 1 ms.

Figure 9:
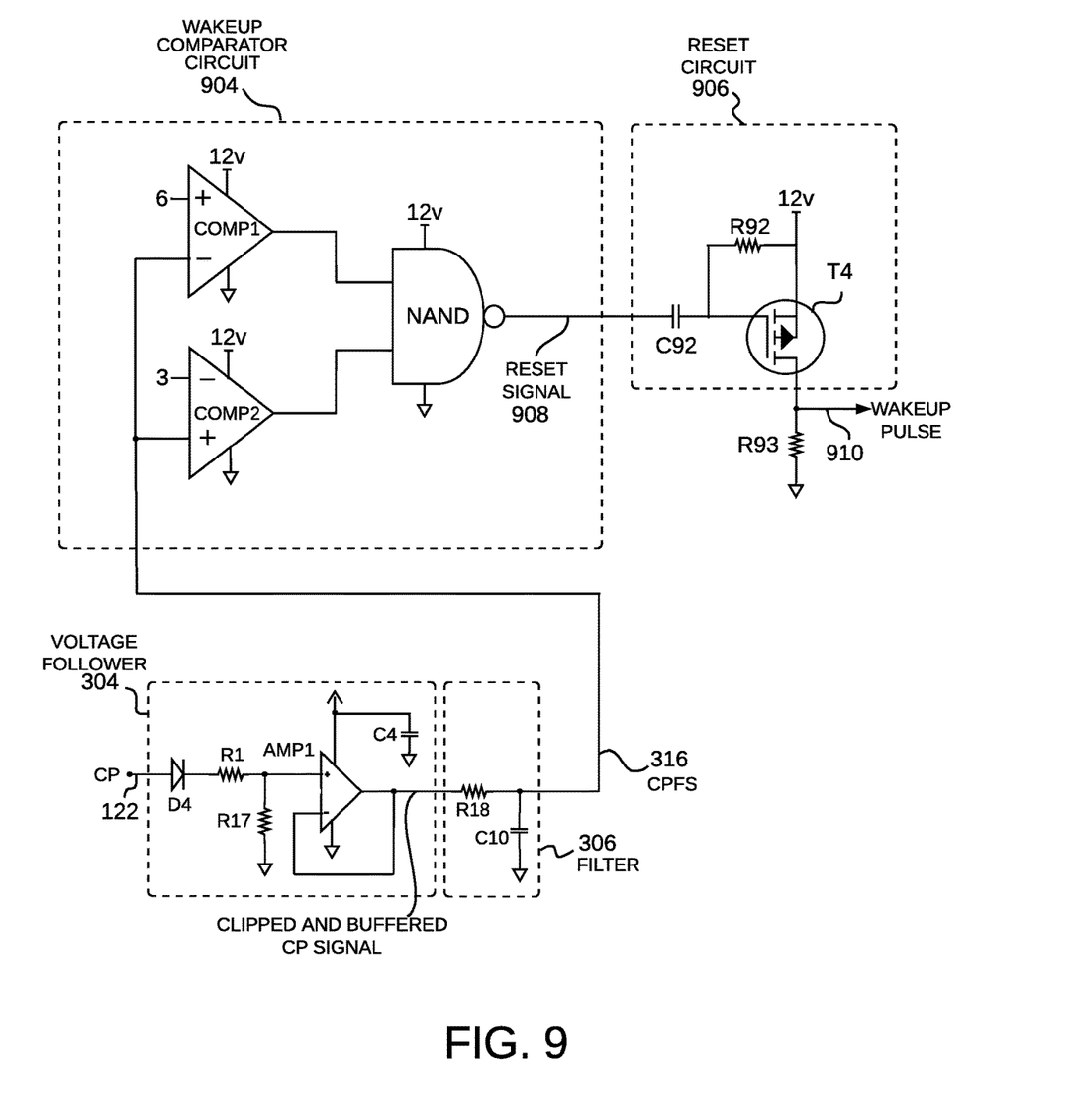
FIG. 9 is a diagram of another embodiment of a wakeup circuit.

FIG. 9 is a diagram of yet another embodiment of the wakeup circuit 118 shown in FIG. 3. The wakeup circuit shown in FIG. 9 comprises the voltage follower 304, filter 306, wakeup comparator circuit 904, and reset circuit 906. The wakeup comparator circuit 904 comprises comparators (COMP1 and COMP2) and a NAND gate. The reset circuit 906 comprises P-channel FET transistor (T4), resistors (R92, R93), and capacitor (C92).

In this embodiment, the resistor R18 and capacitor C10 of the filter 306 form a low-pass filter that is set to have a much lower bandwidth than the 1 kHz oscillation of the CP signal 122. For example, the bandwidth of the filter is set to 100 Hz and has a corner frequency that is determined by ($\frac{1}{2}*\pi*$R18$*$C10). In one embodiment, the value of R18=1 k ohms and C10=1.6 uF. In this configuration, the output of the low-pass filter 306 is a smoothed version of the CP signal 122 after it has been clipped and buffered, which is then referred to as the CPFS signal 316.

Figure 10:
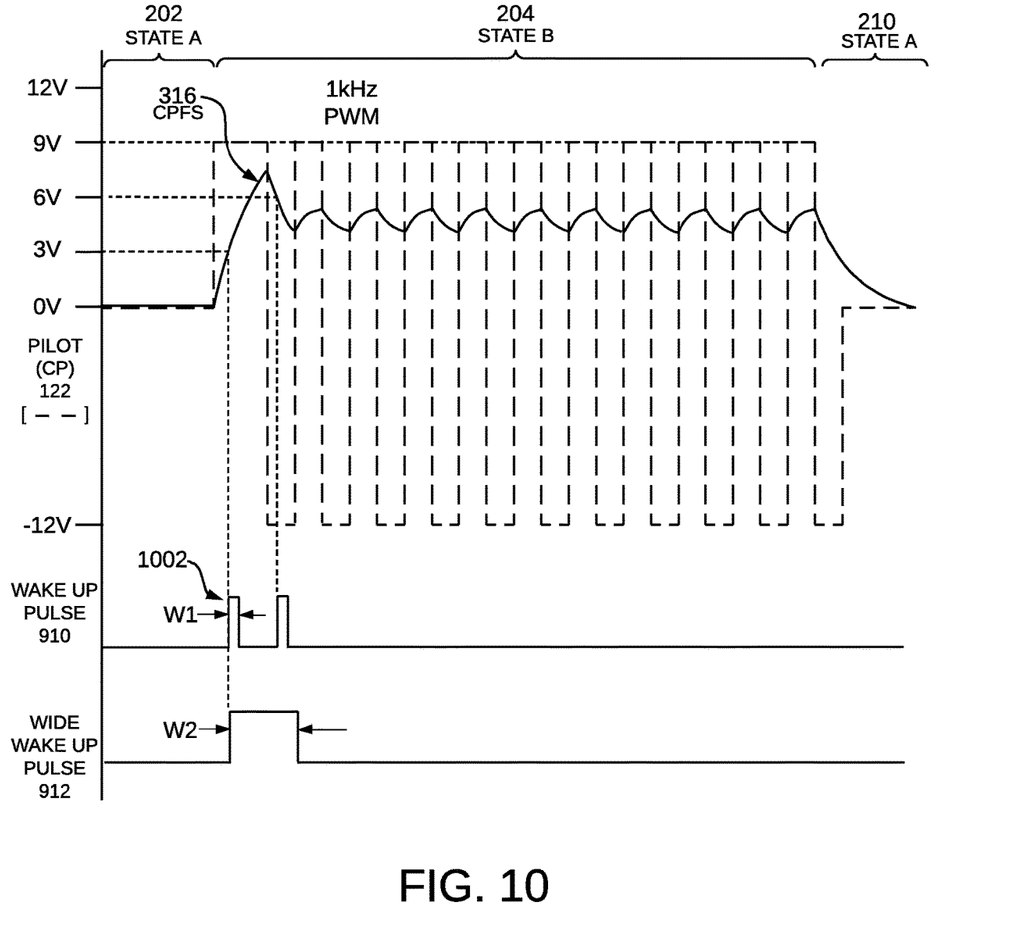
FIG. 10 is a timing diagram that illustrates the generation of a wakeup signal by the wakeup circuit shown in FIG. 9.

FIG. 10 is a timing diagram that illustrates the generation of a wakeup signal by the wakeup circuit shown in FIG. 9. The filtered CPFS signal 316 starts to rise from zero volts at the beginning of State B. Since the vehicle and EVSE are not connected in State A, the 12V level on the CP line on the EVSE side does not reach the CP line on the vehicle side, and therefore the CP level on the vehicle side is zero until the vehicle and EVSE are connected.

Referring again to FIG. 9, as the level of the CPFS 316 starts to rise, the two comparators (COMP1 and COMP2) output 12V when the (+) input is above the (−) input. In this embodiment, the (−) input of COMP2 is set to have voltage levels of 3V and the (+) input of COMP1 is set to have a level of 6V, respectively. The NAND gate comprises two inputs and one active low output. Thus, the NAND gate output results from the following logic. [NOT ((top input) AND (bottom input))].

The NAND gate output will be 12V when the filtered CPFS signal 316 is below 3V or above 6V. When the filtered CPFS signal 316 is in between 3V and 6V, the NAND gate output will drop to 0V. The capacitor C92 capacitively couples the NAND gate output (reset signal 908) to T4, so the FET Gate will be held by R92 to be 12V (FET OFF), except that it will be turned on for a brief time (controlled by R92 and C92 values) anytime the NAND gate output (reset signal 908) transitions from 12V to 0V. This happens when the filtered CPFS signal 316 transitions from outside the 3V-6V range to inside the 3V-6V range. FIG. 10 shows the resulting wakeup pulse 910 that is generated when the filtered CPFS signal 316 exceeds 3V (indicated at 1002) after the vehicle is connected to the EVSE. The wakeup pulse 910 is a pulse having a pulse width (W1) that is controlled by the values of R92 and C92. As illustrated in FIG. 10, the wakeup pulse 910 includes two pulses that result from transitions of the CPFS signal 316 across the 3V and 6V thresholds. In one embodiment, the pulse width (W1) is determined by the value of the capacitor C92.

FIG. 10 also illustrates a wide wakeup pulse 912 that includes only one pulse having a width (W2). The single pulse is triggered when the CPFS signal 316 transitions the 3V threshold. The width (W2) results from the value of the capacitor C92, such that the signal pulse is wide enough to overlap the second pulse generated by the transition of the CPFS signal 316 across the 6V threshold. Thus, tuning of the capacitor C92 allows either one or multiple pulses to be generated.

Figure 11:
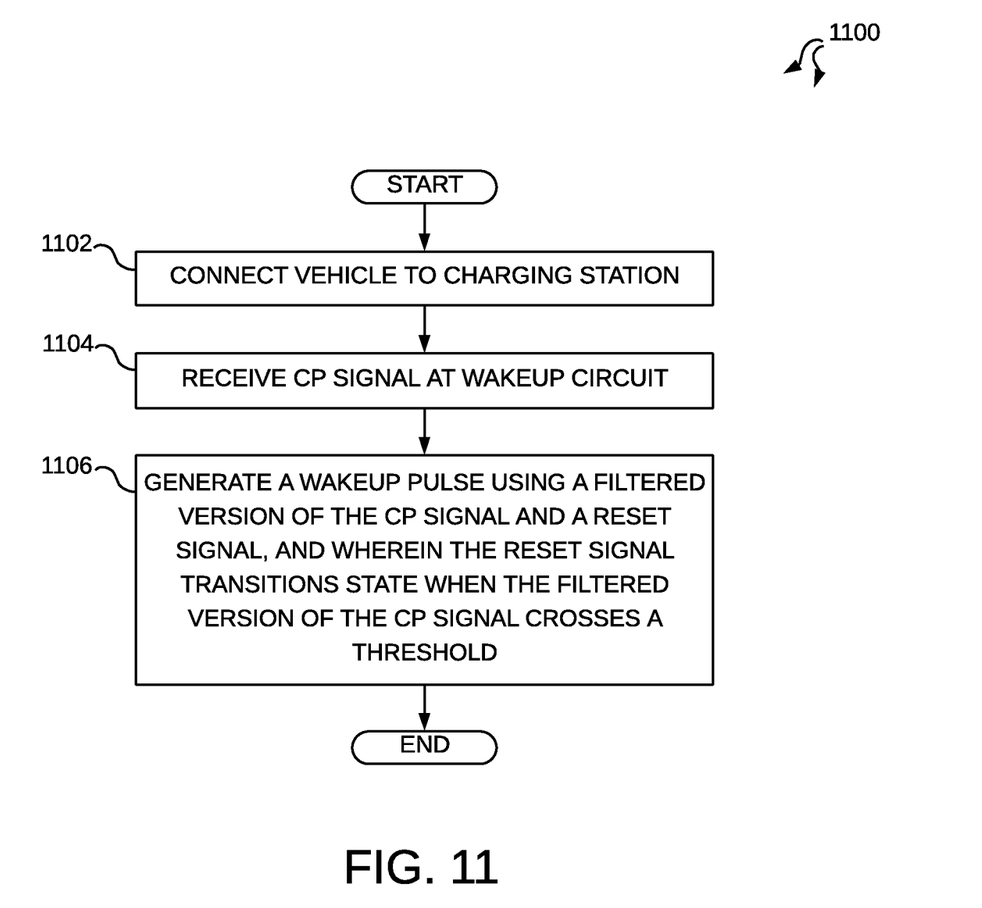
FIG. 11 is a flowchart of a method for generating a wakeup signal during a vehicle charging operation in accordance with one novel aspect.

FIG. 11 is a flowchart of a method 1100 for generating a wakeup signal when a vehicle is connected to a charging station in accordance with one novel aspect. For example, the method 1100 is suitable for use with the wakeup circuit shown in FIG. 9.

At block 1102, the vehicle is connected to a charging station. For example, the vehicle 104 is connected to the charging station 102 using plug 106 and receptacle 108. This configuration allows charging signals to flow to the charging signal generator 110.

At block 1104, a CP signal is received at the wakeup circuit. For example, the CP signal 122 is received at the voltage follower 304.

At block 1106, a wakeup pulse is generated using a filtered version of the charging control signal and a reset signal, wherein the reset signal transitions state when the filtered version of the charging control signal crosses a threshold.

It should be noted that method 1100 is exemplary and that changes, modifications, deletions, combinations, or additions to the method operations are within the scope of the exemplary embodiments.

Although certain specific exemplary embodiments are described above in order to illustrate the invention, the invention is not limited to the specific embodiments. In various exemplary embodiments, a wakeup circuit is provided that operates to generate a wakeup signal in an electric vehicle. In one embodiment, an apparatus is provided that comprises a pulse generator that generates a wakeup pulse signal from a charging control signal. The apparatus also comprises a reset circuit that allows the pulse generator to generate only one wakeup pulse signal until the reset circuit is reset by removal of the charging control signal. In another embodiment, an apparatus is provided that comprises a pulse generator that generates a wakeup pulse signal from a charging control signal. The apparatus also comprises a reset circuit that resets the pulse generator in response to detecting a transition of the charging control signal. Accordingly, various modifications, adaptations, and combinations of various features of the described embodiments can be practiced without departing from the scope of the invention as set forth in the claims.

What is claimed is:

1. An apparatus comprising:
 a wakeup circuit that receives a charging control signal from a charging station, wherein the wakeup circuit generates a wakeup pulse using a filtered version of the charging control signal and a reset signal, wherein the reset signal transitions state when the filtered version of the charging control signal crosses a threshold, and wherein the wakeup circuit comprises:
  a filter, wherein the filter generates the filtered version of the charging control signal using the charging control signal;
  a wakeup comparator circuit having a first comparator and a second comparator, wherein each of the first and second comparators receive the filtered version of the charging control signal, and wherein the wakeup comparator circuit generates the reset signal based on the filtered version of the charging control signal; and
  a reset circuit, wherein the reset circuit generates the wakeup pulse based on the reset signal.

2. The apparatus of claim 1, wherein the charging control signal is a clipped and buffered version of a pilot control signal.

3. The apparatus of claim 2,
 wherein the filter filters the clipped and buffered version of the pilot control signal to generate the filtered version of the charging control signal.

4. The apparatus of claim 1, wherein the reset signal inhibits the wakeup circuit so that only one wakeup pulse is generated until removal of the filtered version of the charging control signal.

5. The apparatus of claim 1, further comprising:
 an opto-coupler that outputs an isolated wakeup signal that is generated from the wakeup pulse.

6. The apparatus of claim 1, wherein the apparatus is configured for use in an electric vehicle, and wherein the charging control signal is received while the electric vehicle is connected to the charging station.

7. A wakeup circuit comprising:
 a filter configured to receive a charging control signal from a charging station, wherein the filter generates a filtered version of the charging control signal using the charging control signal;
 a wakeup comparator circuit configured to generate a reset signal, wherein the reset signal transitions state when the filtered version of the charging control signal crosses a threshold, wherein the wakeup comparator circuit has a first comparator and a second comparator, wherein each of the first and second comparators receive the filtered version of the charging control signal, and wherein the wakeup comparator circuit generates the reset signal based on the filtered version of the charging control signal; and
 a reset circuit configured to generate a wakeup pulse based on the reset signal.

8. The wakeup circuit of claim 7, wherein the reset signal inhibits the wakeup circuit so that only one wakeup pulse is generated until removal of the filtered version of the charging control signal.

9. The wakeup circuit of claim 7, further comprising:
 an opto-coupler that outputs an isolated wakeup signal that is generated from the wakeup pulse.

10. The wakeup circuit of claim 7, wherein the wakeup circuit is configured for use in an electric vehicle, and wherein the charging control signal is received while the electric vehicle is connected to the charging station.

11. A system comprising:
 a charging station; and
 an electric vehicle configured to connect to the charging station, wherein the electric vehicle includes a wakeup circuit comprising:
  a filter configured to receive a charging control signal from a charging station, wherein the filter generates a filtered version of the charging control signal using the charging control signal;
  a wakeup comparator circuit configured to generate a reset signal, wherein the reset signal transitions state when the filtered version of the charging control signal crosses a threshold, wherein the wakeup comparator circuit has a first comparator and a second comparator, wherein each of the first and second comparators receive the filtered version of the charging control signal, and wherein the wakeup comparator circuit generates the reset signal based on the filtered version of the charging control signal; and
  a reset circuit configured to generate a wakeup pulse based on the reset signal.

12. The system of claim 11, wherein the reset signal inhibits the wakeup circuit so that only one wakeup pulse is generated until removal of the filtered version of the charging control signal.

13. The system of claim 11, further comprising:
an opto-coupler that outputs an isolated wakeup signal that is generated from the wakeup pulse.

14. The system of claim 11, wherein the charging control signal is received while the electric vehicle is connected to the charging station.

* * * * *